US007627291B1

(12) United States Patent
James-Roxby et al.

(10) Patent No.: US 7,627,291 B1
(45) Date of Patent: Dec. 1, 2009

(54) INTEGRATED CIRCUIT HAVING A ROUTING ELEMENT SELECTIVELY OPERABLE TO FUNCTION AS AN ANTENNA

(75) Inventors: Philip B. James-Roxby, Longmont, CO (US); Daniel J. Downs, Longmont, CO (US)

(73) Assignee: XILINX, Inc., San Jose, CA (US)

( * ) Notice: Subject to any disclaimer, the term of this patent is extended or adjusted under 35 U.S.C. 154(b) by 422 days.

(21) Appl. No.: 11/040,133

(22) Filed: Jan. 21, 2005

(51) Int. Cl.
*H04B 1/38* (2006.01)

(52) U.S. Cl. ........................ 455/73; 455/333; 455/323; 375/328; 375/324

(58) Field of Classification Search .................. 455/73, 455/333, 323; 375/328, 324
See application file for complete search history.

(56) References Cited

U.S. PATENT DOCUMENTS

| | | | | |
|---|---|---|---|---|
| 4,124,899 | A * | 11/1978 | Birkner et al. | 326/40 |
| 4,978,633 | A * | 12/1990 | Seefeldt et al. | 438/113 |
| 5,016,080 | A * | 5/1991 | Giannella | 257/620 |
| 5,144,166 | A * | 9/1992 | Camarota et al. | 326/41 |
| 5,208,491 | A * | 5/1993 | Ebeling et al. | 326/41 |
| 5,243,238 | A * | 9/1993 | Kean | 326/41 |
| 5,341,049 | A * | 8/1994 | Shimizu et al. | 326/101 |
| 5,423,050 | A * | 6/1995 | Taylor et al. | 714/31 |
| 5,469,003 | A * | 11/1995 | Kean | 326/39 |
| 5,552,722 | A * | 9/1996 | Kean | 326/41 |
| 5,880,598 | A * | 3/1999 | Duong | 326/41 |
| 5,883,525 | A * | 3/1999 | Tavana et al. | 326/39 |
| 5,914,616 | A * | 6/1999 | Young et al. | 326/41 |
| 6,057,708 | A * | 5/2000 | New | 326/41 |
| 6,150,837 | A * | 11/2000 | Beal et al. | 326/39 |
| 6,204,689 | B1 * | 3/2001 | Percey et al. | 326/41 |
| 6,204,815 | B1 * | 3/2001 | Lesea et al. | 343/700 MS |
| 6,326,806 | B1 * | 12/2001 | Fallside et al. | 326/38 |
| 6,370,603 | B1 * | 4/2002 | Silverman et al. | 710/72 |
| 6,500,696 | B2 | 12/2002 | Sutherland | |
| 6,650,141 | B2 * | 11/2003 | Agrawal et al. | 326/41 |
| 6,803,786 | B1 * | 10/2004 | Bilski et al. | 326/41 |
| 6,812,870 | B1 * | 11/2004 | Kryzak et al. | 341/95 |
| 7,116,251 | B1 * | 10/2006 | Groen et al. | 341/100 |
| 7,132,851 | B2 * | 11/2006 | Young | 326/41 |
| 7,187,200 | B2 * | 3/2007 | Young | 326/41 |
| 7,260,424 | B2 * | 8/2007 | Schmidt | 455/575.7 |
| 2002/0067272 | A1 * | 6/2002 | Lemelson et al. | 340/573.4 |
| 2003/0062922 | A1 * | 4/2003 | Douglass et al. | 326/39 |

(Continued)

FOREIGN PATENT DOCUMENTS

WO WO 2004/095703 A2 * 4/2004

OTHER PUBLICATIONS

U.S. Appl. No. 10/683,944, filed Oct. 10, 2003, Young.

(Continued)

*Primary Examiner*—Duc Nguyen
*Assistant Examiner*—Amar Daglawi
(74) *Attorney, Agent, or Firm*—Scott R. Brown; LeRoy D. Maunu

(57) ABSTRACT

An integrated circuit operable to wirelessly communicate with other devices by utilizing a radio transceiver and a routing element is disclosed. The routing element is operable to route a signal between various circuit elements and is selectively operable to function as an antenna when coupled with the radio transceiver.

51 Claims, 6 Drawing Sheets

U.S. PATENT DOCUMENTS

| | | | | |
|---|---|---|---|---|
| 2003/0110339 | A1* | 6/2003 | Calvignac et al. | 710/305 |
| 2004/0007768 | A1* | 1/2004 | Byers et al. | 257/666 |
| 2004/0268286 | A1* | 12/2004 | New et al. | 716/14 |
| 2005/0007147 | A1* | 1/2005 | Young | 326/41 |
| 2005/0007155 | A1* | 1/2005 | Young | 327/47 |
| 2005/0107077 | A1* | 5/2005 | Hintermeier et al. | 455/419 |
| 2007/0101242 | A1* | 5/2007 | Yancey et al. | 714/776 |
| 2007/0201541 | A1* | 8/2007 | Chuang et al. | 375/221 |

OTHER PUBLICATIONS

Drost, Robert J., et al., "Proximity Communication", pp. 1-4, available from Sun Microsystem, Inc., 4150 Network Circle, Santa Clara, CA 95054.

Xilinx, Inc.; "Programmable Logic Data Book 2000"; published Apr. 2000; available from Xilinx, Inc.; 2100 Logic Drive, San Jose, California 95124; pp. 3-1 through 3-96.

* cited by examiner

INTEGRATED CIRCUIT HAVING A ROUTING ELEMENT SELECTIVELY OPERABLE TO FUNCTION AS AN ANTENNA

FIELD OF THE INVENTION

The present invention relates to integrated circuits operable to transmit and receive data utilizing a radio transceiver and at least one routing element selectively operable to function as an antenna.

BACKGROUND OF THE INVENTION

Short-range wireless communication is becoming increasingly popular due to the increasing number of electronic devices utilized by various individuals and the desirability of transferring data between these electronic devices. Advances in data transfer rates and compatibility have further popularized short-range wireless communication as an individual may more easily transmit large amounts of data between multiple electronic devices. For example, individuals often desire to transfer data between various electronic devices such as laptop computers, personal digital assistants (PDAs), cellular phones, personal computers, etc. Protocols such as Bluetooth and Ultra-wideband (UWB) communications are often utilized to facilitate the wireless transfer of data between electronic devices.

Unfortunately, these beneficial aspects of wireless data transfer between electronic devices are often impeded by the requirement that electronic devices utilize external antennas. For example, a radio transceiver implemented utilizing an integrated circuit conventionally requires an external antenna, which must also be interfaced with the integrated circuit. The interfacing of external antennas with one or more integrated circuits presents various difficulties, such as the size, power, and cost of providing the external antenna and the fixed form factor and/or propagation pattern created by utilization of external antennas.

Additionally, the utilization of external antennas increases the required size of electronic devices. For example, increases in technology have dramatically reduced the size of integrated circuits, but the advantages of such reduced sizes are limited by the requirement that integrated circuits be coupled with relatively large external antennas to wirelessly transmit data. Thus, the minimum size required of conventional electronic devices to wirelessly transmit data is increased by the use of external antennas.

Furthermore, conventional antennas have fixed configurations that produce fixed form factors and propagation patterns. Once manufactured, conventional antennas may not be easily modified to form other antenna configurations to produce other propagation patterns. Use of electronic devices having fixed antenna configurations is often limited to a single application as a desired propagation pattern may vary based on the particular application of an electronic device. Thus, conventional antennas are unable to be dynamically modified to conform to a desired antenna configuration required by a subsequent or altered use of the antenna.

Similarly, due to the fixed configuration of conventional antennas, devices including embedded antennas, such as conventional RFID devices, must be specifically orientated or aligned to transmit and receive data. Specific orientation and alignment requirements often prevent the use of embedded devices, as specific alignment is often impossible or impractical due to the layout constraints of a utilized device. For instance, the form factor of an integrated circuit mounted upon a circuit board may prevent antenna usage because of other constraints associated with the design of the board. Thus, various devices such as integrated circuits having a fixed layout position are often unable to communicate with other devices due to the inability to change antenna configurations to conform to a fixed layout constraint. The limitations described above generally exist regardless of whether a device is utilized for intra-board or off board communications.

The limitations associated with external antennas are not limited to fixed integrated circuits, as reprogrammable logic devices suffer from the same limitations. Reprogrammable logic devices, such as field programmable gate arrays ("FPGA"), are commonly utilized in all types of digital logic applications. FPGAs typically include an array of logic function generators or configurable logic elements, input/output ports, and a matrix of interconnect lines.

In conventional FPGAs, the matrix of interconnect lines generally surrounds the configurable logic elements and connects logic data signals between the configurable logic elements and between the configurable logic elements and the input/output ports. FPGAs are configured by programming memory elements, such as static RAM cells, anti-fuses, EPROM cells, and EEPROM cells, which control configuration of the device. Depending on the programming of the memory elements, the configurable logic elements will perform different logic functions and be connected to each other and to the inpuVoutput ports in a variety of ways. In general, FPGA's also provide programmable memory cells to configure other features on the IC. For instance, the routing of clock signals and use of multiple clock nets on a FPGA is often programmably selectable by the user.

Consequently, FPGAs may be utilized in a wide variety of situations in which wireless communication is desirable. However, conventional FPGAs are generally limited to utilizing external antennas in a similar manner to that described above and thus suffer the same limitations as other conventional circuits.

SUMMARY OF THE INVENTION

Various embodiments of the present invention solve the above-described problems and provide a distinct advance in the art of integrated circuits. More particularly, the invention provides an integrated circuit operable to transmit and receive data utilizing a radio transceiver and a routing element selectively operable to function as an antenna.

Accordingly, in one embodiment of the present invention, there is provided an integrated circuit having a radio transceiver, a plurality of circuit elements, and a routing element for routing a signal between at least two of the circuit elements. The routing element can be coupled with the radio transceiver to selectively operate as an antenna to enable the integrated circuit to transmit and/or receive data.

In another embodiment, there is provided a programmable logic device having a radio transceiver, a plurality of circuit elements, and a plurality of routing elements for routing at least one signal between at least two of the circuit elements. At least one of the routing elements can be coupled with the radio transceiver and programmed to selectively operate as an antenna such that the radio transceiver and at least one of the routing elements may transmit and receive data.

In another embodiment, there is provided a programmable logic device having a radio transceiver, a plurality of circuit elements, a plurality of routing elements, and a programmable routing matrix for routing at least one signal between at least two of the circuit elements. The routing matrix is operable to be coupled with the radio transceiver and is formed from at least a portion of the routing elements. The routing matrix is programmable to selectively form an antenna configuration from at least one of the routing elements such that the radio transceiver and the antenna configuration are operable to transmit and receive data.

In another embodiment, there is provided a method of transmitting and receiving data utilizing a programmable logic device having a radio transceiver and a routing matrix operable to be coupled with the radio transceiver. The method of transmitting and receiving data includes the steps of programming the routing matrix to selectively form an antenna configuration and transmitting and receiving data utilizing the radio transceiver and the programmed antenna configuration.

It is understood that both the foregoing general description and the following description of various embodiments are exemplary and explanatory only and are not restrictive of the invention as claimed. The accompanying drawings, which are incorporated in and constitute a part of this specification, illustrate some embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

DESCRIPTION OF THE INVENTION

Reference will now be made in detail to some embodiments, examples of which are illustrated in the accompanying drawings. Wherever possible, the same reference numbers are used throughout the drawings to refer to the same or like parts.

Figure 1:
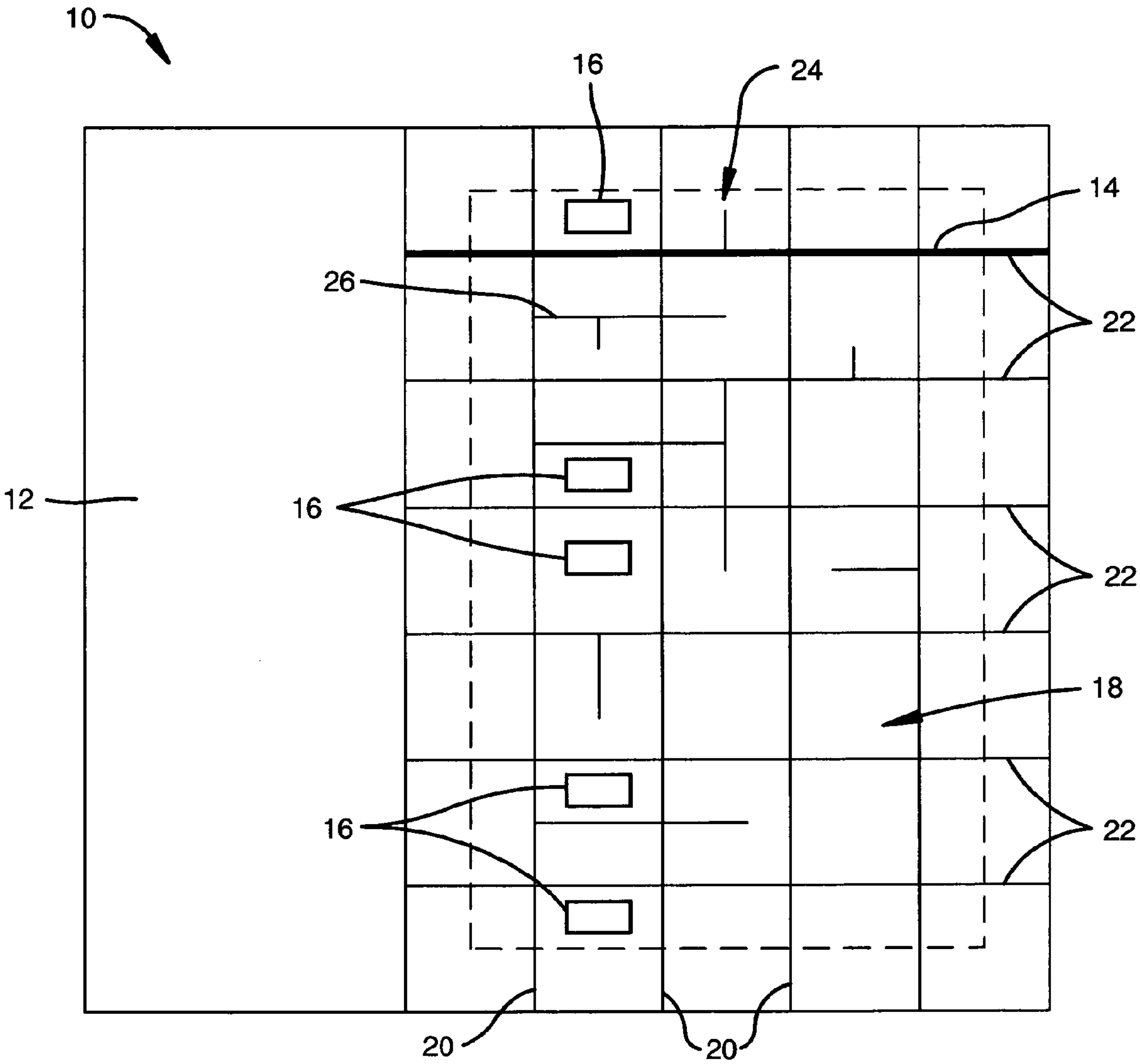
FIG. 1 is a diagram illustrating an integrated circuit operable to transmit and receive data utilizing a radio transceiver and a routing element selectively operable to operate as an antenna.

Referring initially to FIG. 1, an embodiment of the present invention involves an integrated circuit 10 having a radio transceiver 12 and at least one routing element 14 operable to selectively function as an antenna. The integrated circuit 10 additionally includes a plurality of circuit elements 16 operable to perform various functions, as described below in more detail. The integrated circuit 10 is operable to transmit data to and receive data from other integrated circuits or devices by utilizing the radio transceiver 12 and at least one routing element 14.

The integrated circuit 10 may be any circuit configured as described herein. Thus, the integrated circuit 10 may be a conventional application-specific integrated circuit (ASIC) or other conventional integrated circuits such as SSI, MSI, LSI, or VLSI integrated circuits.

Preferably, the integrated circuit 10 is a programmable logic device (PLD) such as those manufactured by Xilinx Corporation of San Jose, Calif. As is known in the art, PLDs are integrated devices having a plurality of selectable logic functions. Examples of PLDs include programmable array logic, generic array logic devices, and field-programmable gate arrays (FPGAs). Various FPGAs are described in pages 3-96 of the Xilinx 2000 Data Book entitled "The Programmable Logic Data Book 2000", published in April of 2000, available from Xilinx, Inc., 2100 Logic Drive, San Jose, Calif. 95124, which pages are incorporated herein by reference.

The radio transceiver 12 is operable to transmit and receive data when coupled with one or more of the routing elements 14 that selectively operate as antennas. The radio transceiver may be a conventional integrated radio transceiver 12 that is operable to amplify and transmit a signal through at least one routing element 14 or receive a transmitted signal through at least one routing element 14. Thus, the radio transceiver 12 may be a generally conventional integrated radio transceiver which is coupled with at least one routing element 14 to utilize the routing element 14 as an antenna.

In embodiments where the integrated circuit 10 is a PLD such as a FPGA, the radio transceiver 12 may be implemented utilizing configurable logic blocks or other programmable fabric, such as the logic blocks and circuit elements 16 described below in detail. However, it will be appreciated that it is preferable to implement the radio transceiver 12 utilizing elements other than conventional logic blocks or other generally conventional CMOS technology due to the sensitive power supply requirements of the radio transceiver 12. For example, those skilled in the art will appreciate that the amplification of signals generally demands power requirements in excess of what conventional CMOS circuits may provide.

Thus, in embodiments where in the integrated circuit 10 is a PLD, it is desirable to include conventional programmable logic blocks and/or programmable fabric in a first core type, such as generally conventional CMOS, and to include the radio transceiver 12 in a second core type which provides for the sensitive power supply requirements of the radio transceiver 12. Such a configuration enables the various benefits and advantages of CMOS, such as low power and high efficiency, to be achieved while simultaneously providing for the power requirements of the radio transceiver 12.

Preferably, the radio transceiver 12 is implemented by utilizing application specific modular block architecture (ASMBL). ASMBL is described in detail in U.S. patent application Ser. No. 10/683,944, filed Oct. 10, 2003, and which is incorporated herein by reference, and is available in the Virtex-4 FPGA product from Xilinx Corp. of San Jose, Calif. ASMBL provides for the power requirements of the radio transceiver 12 by enabling power and ground to be placed anywhere on the integrated circuit 10. Thus, the radio transceiver 12 is not required to share power and ground with other elements, such as CMOS logic elements and programmable fabric, thereby providing for stable power and ground, as is generally desirable for integrated radio transceivers, such as the radio transceiver 12. Thus, by utilizing ASMBL, the radio transceiver 12 and standard CMOS logic may be placed in proximity and interfaced together on the same integrated circuit 10 without inhibiting the performance of the radio transceiver 12 or the circuit elements 16.

Alternatively, the radio transceiver 12 may be implemented by utilizing architectures other than ASMBL such as other mixed-signal architectures. Thus, the integrated circuit 10 may be implemented utilizing only conventional CMOS, a combination of conventional CMOS and mixed-signal architecture such as ASMBL, or by any other method which provides for the sensitive power requirements of the radio transceiver 12, including a radio transceiver which is operable to utilize conventional CMOS power and ground.

Due to the speed and low-power consumption of CMOS, it is preferable that the radio transceiver 12 implement low-level functions that may not be easily implemented in CMOS and that high-level functions be implemented by the circuit elements 16 in CMOS. For example, it is preferable that the radio transceiver 12 perform low-level functions such as amplification and collision detection while CMOS or other elements, such as the circuit elements 16 described below, perform high-level functions such collision resolution policy. However, all radio functions may be performed by the radio transceiver 12 and the number of functions performed by the radio transceiver 12 may be varied or otherwise programmable when the integrated circuit 10 is a PLD, as described in more detail below.

The radio transceiver 12 may transmit and receive data utilizing conventional protocols and methods. For example, the radio transceiver 12 may utilize the Bluetooth protocol to transmit data over short-ranges, such as to another integrated circuit positioned on the same board as the integrated circuit 10 or an external electronic device positioned off the board, such as a computing device, an electronic device, a logic analyzer, a router, a hand-held programmer, and/or any combination thereof. Thus, the integrated circuit 10 may be utilized for intra-board and off board communications. As is known in the art, Bluetooth operates at approximately 2.45 GHz and may achieve transfer rates of approximately 723 kbit/sec.

However, due to the power requirements and antenna size requirements of Bluetooth, it is preferable to utilize ultra-wideband (UWB) frequencies in transmitting and receiving data instead of Bluetooth or other conventional short-range wireless transmission methods. As is known in the art, UWB is a radio modulation technique that transmits short-duration pulses over a very large occupied bandwidth. The short-duration pulses, which may span only a few nanoseconds, are relatively immune to multi-path cancellation effects and are well suited for high-speed wireless applications over generally short distances. Additionally, UWB only consumes power when transmitting, and has minimal RF complexity that enables UWB transceivers to be easily implemented utilizing known and readily-accessible technology.

Preferably, the radio transceiver 12 utilizes a frequency of approximately 10 GHz. 10 GHz is within a desired range of UWB communications and requires an antenna to be only approximately 3 cm in length. In contrast, Bluetooth would require an antenna to have a length of approximately 10 cm. Thus, in addition to the other advantages described above, UWB is preferable as a 3 cm length may be more easily included within a conventional integrated circuit than a 10 cm length due to the generally desirable small size of conventional integrated circuits. For example, FPGA's generally include long-lines having lengths of approximately 3 cm, as described below.

Alternatively, the radio transceiver 12 may utilize one or more frequencies, including dynamically selected frequencies. For example, in embodiments where the integrated circuit 10 is a PLD, the PLD may be selectively programmed to set one or more desired frequencies for the radio transceiver 12. Thus, the integrated circuit 10 may transmit and receive data utilizing one or more protocols and/or one or more frequencies.

Similarly, the radio transceiver 12 may be directly programmed to operate at a desired frequency or within a desired frequency range. Additionally, other radio functionality, such as the low-level functionality described below, may be selectively implemented by programming the integrated circuit 10 or radio transceiver 12 directly.

In addition to the radio transceiver 12, the integrated circuit 10 includes the plurality of circuit elements 16. The circuit elements 16 enable the conventional logic functionality of the integrated circuit 10. For example, if the integrated circuit 10 is a FPGA, the circuit elements 16 may include various configurable logic blocks or programmable fabric to enable conventional PLD or FPGA functionality. Thus, the circuit elements 16 may be conventional CMOS PLD elements such as logic gates, arrays of logic gates, logic blocks, etc, which are operable to perform various functions as described below.

The circuit elements 16 enable the integrated circuit 10 to perform various conventional functions in addition to the functions described herein. It will be appreciated that the circuit elements 16 need not perform functions by themselves, but rather that groups of the circuit elements 16 may be configured and/or programmed to perform desired functions. Thus, the circuit elements 16 are preferably generally conventional logic block structures such as those included in generally conventional FPGAs.

The circuit elements 16 may programmed to perform functions unrelated to transmitting and receiving radio waves depending on the requirements of the desired implementation. Thus, the circuit elements 16 may be programmed to perform generally conventional functions to enable the integrated circuit 10 to perform multiple functions.

Preferably, the circuit elements 16 are programmed perform various high-level radio functions. As described above, the radio transceiver 12 preferably performs various low-level functions such as amplification and collision detection to maximize the benefits of ASMBL, or other mixed signal architectures, and the low power and high speed and efficiency of CMOS. The high-level functionality such as collision resolution policy and signal analysis is preferably implemented by the circuit elements 16 in CMOS such that power consumption is minimized and efficiency is maximized. Additionally, the high-level functionality performed by the circuit elements 16 may be utilized such that when the integrated circuit 10 is a PLD it may be conventionally programmed to implement the desired high-level functionality. Thus, the desired functionality of the integrated circuit 10 and radio transceiver 12 may be dynamically modified by programming the integrated circuit 10.

At least one routing element 14 may be coupled with the radio transceiver 12 to selectively operate as an antenna. The routing element 14 additionally routes a signal between at least two of the circuit elements 16 in a substantially conventional manner such as by forming a conduction path between at least two circuit elements 16. Thus, the routing element 14 may selectively either route a signal between at least two of the circuit elements 16 or operate as an antenna by coupling with the radio transceiver 12.

Preferably, the integrated circuit 10 includes a plurality a routing elements 14 which comprise at least a portion of a routing matrix 18. The routing matrix 18 couples the circuit elements 16 in a substantially conventional manner to enable one or more signals to pass between the various circuit elements 16. The routing matrix 18 may also be coupled with the radio transceiver 12 through at least one of the routing elements 14 to enable one or more of the routing elements 14 to operate as an antenna. In such an embodiment, one or more of the routing elements 14 form an antenna configuration to selectively operate as an antenna.

As described in detail below, the antenna configuration may be any configuration operable to operate as an antenna.

For example, the antenna configuration may be a horizontal or vertical line configuration (FIG. 1), a dipole configuration (FIG. 2), a yagi-type configuration (FIG. 3), a horizontal line array configuration (FIG. 4), a loop configuration (FIG. 5), or any combination thereof.

In preferred embodiments the integrated circuit is a PLD and the routing matrix 18 couples the various circuit elements 16 to enable selective logic functionality in a substantially conventional manner. Thus, the interconnectivity of the various circuit elements 16 may be conventionally programmed to modify the routing matrix 18 to select the desired circuit functionality.

Figure 2:
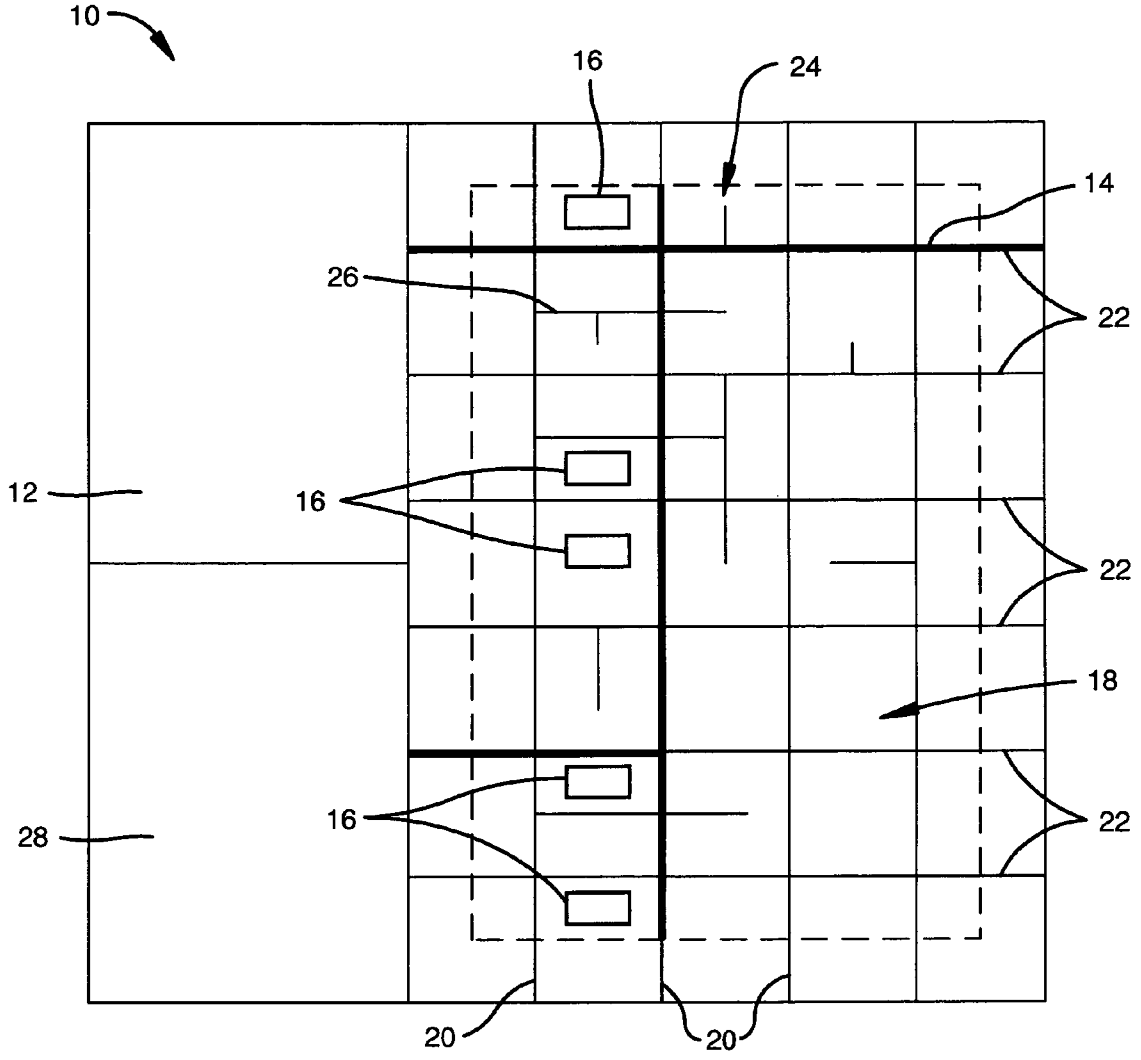
FIG. 2 is a diagram illustrating an integrated circuit having two radio transceivers and a dipole antenna configuration.

Additionally, the selective modification of at least one routing element 14 and/or the routing matrix 18 enables a particular routing element 14, portion of the routing matrix 18, and/or antenna configuration to be dynamically selected to operate as an antenna. For example, in one embodiment the routing matrix 18 may be programmed to form a horizontal line antenna configuration (FIG. 1) which may by dynamically modified, through programming of the PLD, to form a dipole antenna configuration (FIG. 2). Similarly, any desired antenna configuration may be dynamically modified, through programming of the PLD, to form another desired antenna configuration. Such dynamic forming of the antenna configuration provides for flexible transmission and receiving of data as the antenna configuration may be dynamically modified to conform to various protocols. For example, a first antenna configuration may enable transmission utilizing the Bluetooth protocol that may be dynamically modified to a second antenna configuration that enables transmission utilizing UWB frequencies. It will be appreciated that other configurations may be utilized, as described below, to form other desired antenna configurations and functionality.

Similarly, a first antenna configuration may transmit and receive data utilizing radio waves having a first polarity and a second antenna configuration may transmit and receive data utilizing radio waves having a second polarity, orthogonal of the first. Such use of orthogonal polarity radio waves and antenna configurations enables multiple devices, such as multiple integrated circuits, to transmit and receive data generally simultaneously within close proximity without incurring negative effects from interference.

The antenna configuration may also be dynamically changed, such as to form an alternate configuration, in situations where the integrated circuit 10 has been positioned such that its original antenna configuration is inoperable or inefficient. Thus, the antenna configuration may be modified to affect the antenna's sensitivity and performance. For example, if a first antenna configuration is undesirable due to sensitivity or performance issues, a second antenna configuration may be programmed to increase sensitivity and performance, such as by reducing power consumption.

Furthermore, the selective modification of the routing matrix 18, by programming the PLD, enables a portion of the routing matrix 18, such as one or more routing elements 14, to operate as an antenna and be dynamically modified to operate as a generally conventional routing element. For example, a first antenna configuration may utilize a first routing element as a portion of the antenna configuration, and be dynamically modified, by programming the PLD, to form a second antenna configuration that utilizes the first routing element as a conventional routing element. Thus, a particular routing element may operate as an antenna and then be dynamically modified to operate as a conventional routing element. Such dual functionality of the routing elements 14 provides operational flexibility as multiple antenna and routing matrix 18 configurations may be dynamically utilized by the integrated circuit 10.

The routing elements 16 may additionally include one or more long-lines. As is known in the art, long-lines are routing elements that generally span the length of an integrated circuit, specifically a PLD. Typically, long-lines are utilized as primary passageways for signals through the PLD. For example, a particular long line may have a plurality of secondary lines extending therefrom to enable the propagation of signals throughout an integrated circuit. The one or more long-lines are preferably utilized to operate as antennas, such as by inclusion in at least a portion of the routing matrix 18, as the length of the long-lines present in conventional PLDs corresponds to one or more desired antenna lengths.

For example, in one embodiment, the integrated circuit 10 includes at least one long-line having a length of approximately 3 cm, which corresponds to a utilized frequency of 10 GHz, that falls within a desired UWB spectrum as described above. Thus, the utilization of at least one long-line simplifies the formation of the antenna configuration and the utilization of frequencies within the UWB spectrum.

Preferably, the routing elements 14 include at least one vertical long-line 20 and at least one horizontal long-line 22. The horizontal long-lines 22 generally span the horizontal length of the integrated circuit 10 and the vertical long-lines 20 generally span the vertical length of the integrated circuit 10, as depicted in FIG. 2. In some embodiments, the horizontal long-lines 22 and vertical long-lines 20 generally span the horizontal and vertical lengths of only a particular region of the integrated circuit 10, such as a programmable fabric region 24 that includes primarily CMOS circuit components, such as the circuit components 16. Thus, the horizontal long-lines 22 and vertical long-lines 20 do not necessarily extend throughout the entire integrated circuit 10, such as within regions including ASMBL or other mixed-signal architectures.

As shown in FIGS. 1-5, the various antenna configurations may include at least one horizontal long-line 22 and at least one vertical long line 20. Additionally, the various antenna configurations may include portions of vertical long-lines and/or horizontal long-lines in addition to or in place, of other routing elements. For example, an antenna configuration may be formed by the coupling of one or more long-lines or portions of long-lines with additional or supplemental routing elements, such as secondary routing elements 26, as described below in more detail.

Referring to FIG. 2, an antenna configuration is shown including one vertical long line 20 and one horizontal long line 22. Such an antenna configuration may be utilized as a dipole antenna configuration or each long line 20, 22 may separately or simultaneously operate as an antenna without incurring interference from each other. Specifically, the opposed orientation of the long lines 20, 22 enables the transmission and/or reception of radio waves having opposed polarities, as described above in detail.

Additionally, the integrated circuit 10 of FIG. 2 includes a second radio transceiver 28 in addition to the radio transceiver 12 to enable each long line 20, 22 to operate as an antenna by coupling with a separate radio transceiver. For example, horizontal long line 22 is illustrated coupled with the radio transceiver 12 and vertical long line 20 is illustrated coupled with the second radio transceiver 28. Utilization of more than one radio transceiver facilitates the simultaneous use of the long lines 20, 22 as antennas because the functionality of each long line 20, 22 may be controlled by the separate radio transceivers 20, 22.

Alternatively, one or more long lines and/or other routing elements 14, including the entire antenna configuration and/or secondary routing elements 26, may be coupled with a single radio transceiver, such as the radio transceiver 12, such that the use of additional radio transceivers is not required. Thus, a single radio transceiver or a plurality of radio transceivers may be utilized by the integrated circuit 10 to drive or otherwise function with one or more portions of the antenna configuration.

Figure 3:
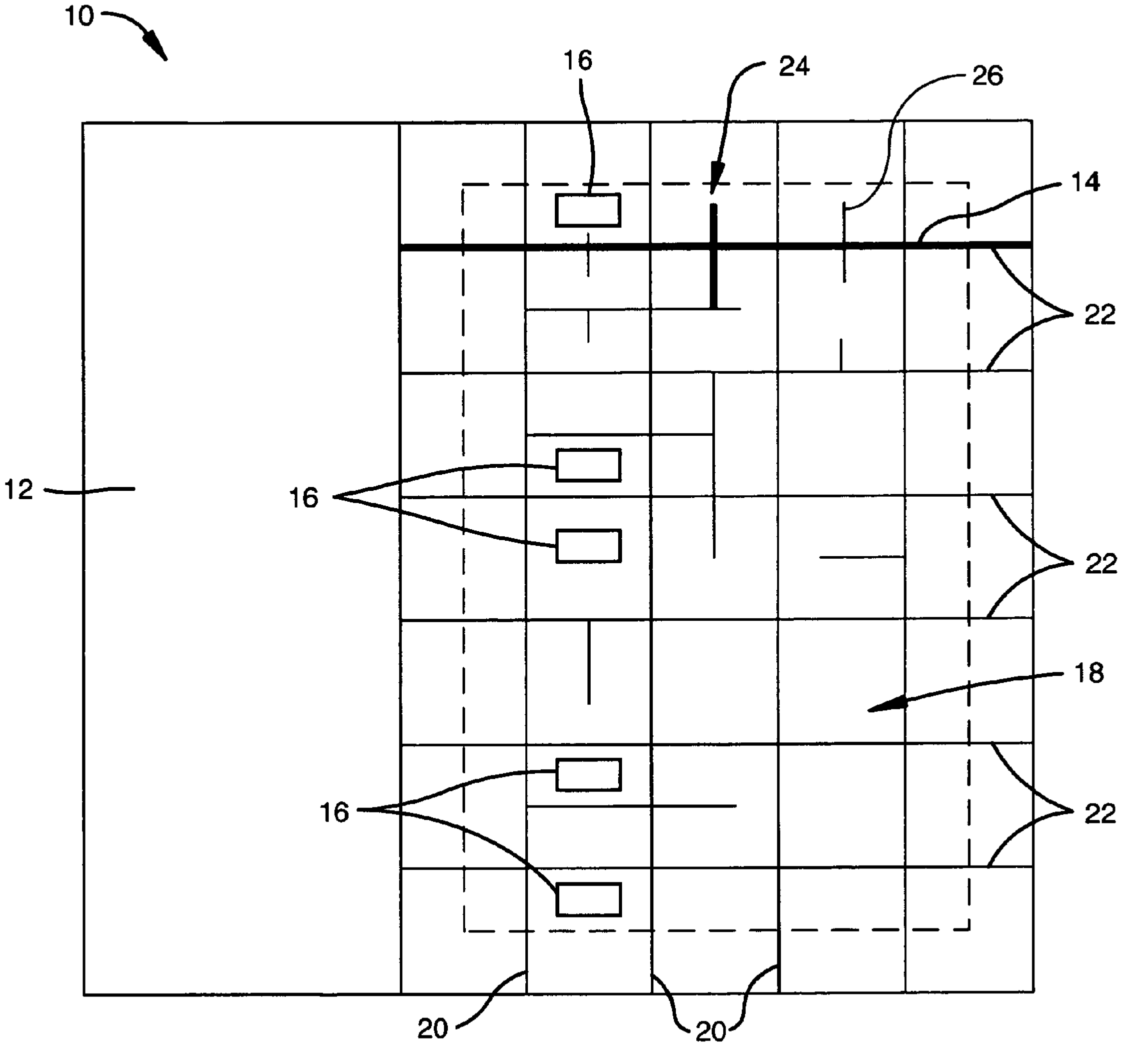
FIG. 3 is a diagram illustrating the integrated circuit of FIG. 1 having a yagi-type antenna configuration.

Referring to FIG. 3, an antenna configuration including a yagi-type configuration is shown comprised of a horizontal long line 22 and routing elements 14 arranged perpendicular to the horizontal long line 22. As is known in the art, a yagi-type antenna configuration is an antenna including an array of dipoles having at least one driven dipole and at least one reflecting dipole. Yagi-type antenna configurations generally operate only in a given direction along an axis perpendicular to the dipoles. In the yagi-type configuration of FIG. 3, the routing elements 14 are perpendicular to the horizontal long line 22 and operate as dipoles. The perpendicular routing elements may be long lines, such as vertical long lines 20, or secondary routing elements 26.

It will be appreciated that numerous yagi-type antenna configurations may be formed from the routing matrix 18, long lines 20, 22, and/or secondary routing elements 26. Thus, the yagi-type configurations disclosed herein are not limited to the illustration of FIG. 3. Furthermore, yagi-type antenna configurations include configurations which are less than a full wavelength in length, such as configurations having a maximum length of one-half or one-third wavelength to enable yagi-type antenna configurations to be utilized even when a length corresponding to a full wavelength is unavailable.

Additionally, the integrated circuit 10 may utilize a plurality of yagi-type configurations such as a vertical yagi-type configuration and a horizontal yagi-type configuration to simultaneously transmit and receive directional radio waves and/or polarized radio waves as described above. Similarly, the plurality of yagi-type configurations may each couple with one or more radio transceivers, in addition to the radio transceiver 12, as is also described above.

Furthermore, in embodiments where the integrated circuit 10 is a PLD, the antenna configuration may be dynamically modified. Thus, the integrated circuit 10 may include a first yagi-type antenna configuration that may be dynamically modified to a second yagi-type antenna configuration. Such dynamic modification of yagi-type antenna configurations provides transmission and reception flexibility, as a first yagi-type configuration may be utilized to transmit a radio wave in a first direction and then a second yagi-type antenna configuration may be dynamically implemented to transmit a radio wave in a second direction.

Figure 4:
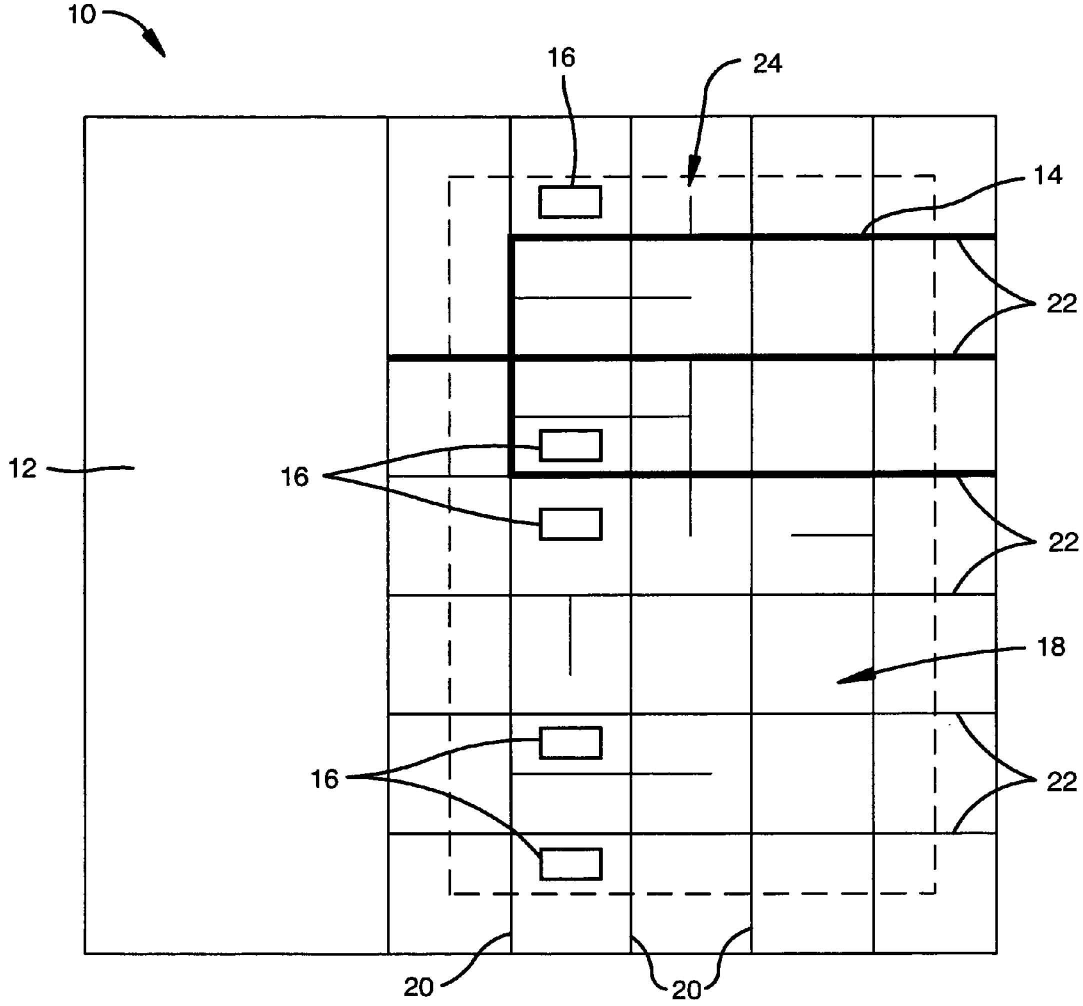
FIG. 4 is a diagram illustrating the integrated circuit of FIG. 1 having a horizontal array antenna configuration.

Referring to FIG. 4, a horizontal array antenna configuration including a plurality of horizontal long lines 22 is illustrated. The antenna configuration of FIG. 4 may be utilized to form a phased-array antenna configuration and/or planar-array configurations. The antenna configuration of FIG. 4 may similarly be implemented utilizing vertical-long lines 20 to form an antenna configuration having an orthogonal orientation to the horizontal antenna configuration illustrated in FIG. 4. Additionally, as described above, the antenna configuration may be dynamically modified, such as by utilizing a first antenna configuration having a plurality of horizontal long lines 22 and then utilizing a second antenna configuration having a plurality of vertical long lines 20. As is also described above, the antenna configuration of FIG. 4 may be coupled with one or more radio transceivers in addition to the radio transceiver 12.

Figure 5:
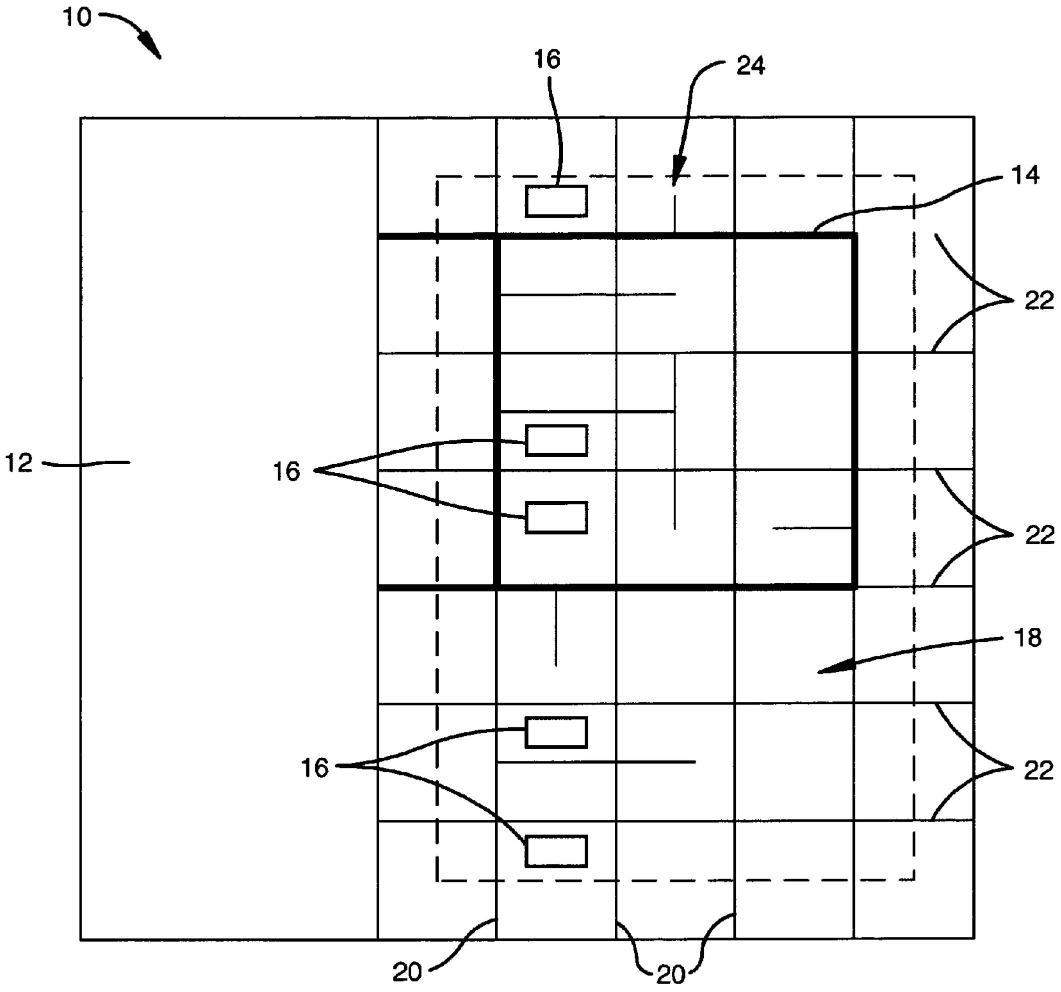
FIG. 5 is a diagram illustrating the integrated circuit of FIG. 1 having a loop antenna configuration.

Referring to FIG. 5, an antenna configuration including a loop configuration is illustrated comprised of two vertical long lines 20 and two horizontal long lines 22. The loop configuration may be a large loop configuration or a small (magnetic) loop configuration. In embodiments where the loop configuration is a small loop configuration, the antenna configuration is operable to detect the magnetic field of a radio wave. However, detection of magnetic fields within the integrated circuit 10 may be complicated by the circuit elements 16, radio transceiver 12, and or other elements, thus rendering the large loop configuration the preferred loop configuration. As described above, the loop configuration of FIG. 5 may be dynamically modified and may be driven by one or more radio transceivers in addition to the radio transceiver 12.

It will be appreciated that innumerable antenna configurations are known in the art, including but not limited to the above configurations and other configurations such as whip, ground plane, omnidirectional, quad, helical, and random wire antenna configurations. Such various antenna configurations may be implemented by the present invention through the configuration or selective programming of the routing elements 14 and/or routing matrix 18. Thus, the present invention is not limited to the antenna configurations illustrated and described herein, as innumerable variations may be implemented by selectively utilizing the routing elements 14 and/or routing matrix 18 in a desired manner.

Additionally, in embodiments where the integrated circuit 10 is a PLD, the antenna configurations may be dynamically modified, including the modification of antenna configurations from a first-type to a second-type. For example, the integrated circuit 10 may initially include a first antenna configuration such as the dipole configuration of FIG. 2, and then be dynamically modified to include a second antenna configuration such as the yagi-type configuration of FIG. 3. Thus, the dynamic modification of antenna configurations is not limited to configurations within a predetermined class, as the routing elements 14 may be modified to form any desired antenna configuration.

Furthermore, FIGS. 1-5 are not drawn to scale, such that the various antenna configurations do not necessarily represent actual dimensions. For example, antenna configurations generally correspond to a desired wavelength, such as utilizing 3 cm for a 10 GHz UWB radio wave. The form and shape of the antenna configurations illustrated herein do not necessarily correspond to a particular or desired wavelength, and instead are presented to enable one skilled in the art to comprehend the various antenna configurations that may be utilized by the present invention.

Figure 6:
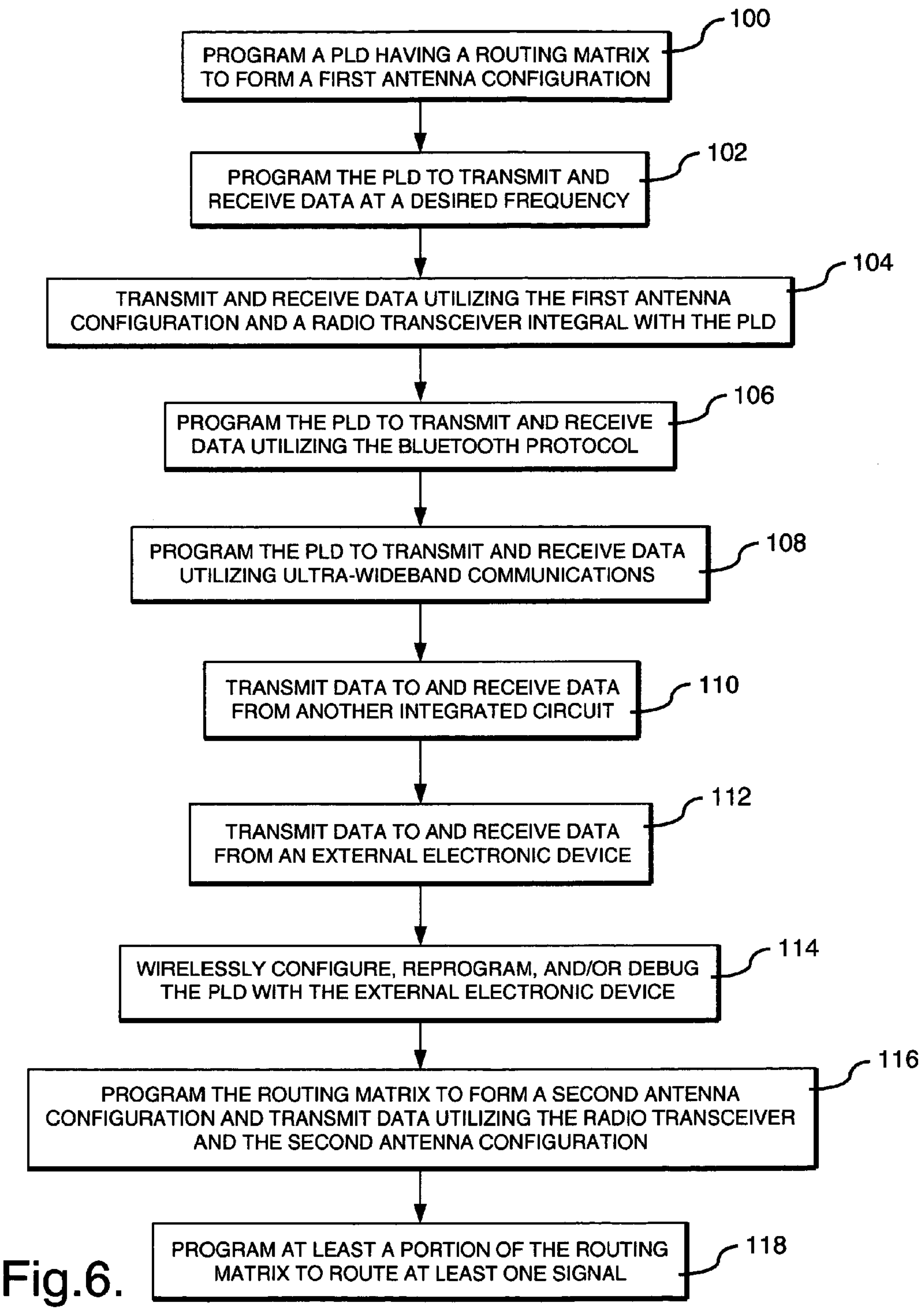
FIG. 6 is a flow chart illustrating example steps operable to be performed by various embodiments of the integrated circuit of FIG. 1.

Referring now to FIG. 6, the integrated circuit 10 may be dynamically programmed or otherwise configured to perform the illustrated exemplary steps, 100-118. It will be appreciated that steps 100-118 are not exhaustive in nature and need not be fully implemented or even be implemented in any particular order as they are provided merely to assist in illustrating the various functionality of some embodiments of the integrated circuit 10.

The integrated circuit 10 may be initially provided with an antenna configuration. Preferably, the integrated circuit 10 is a PLD having a first antenna configuration that may be programmed by a user as shown in step 100. The antenna configuration(s), and/or the operational functionality described herein, may be programmed by the user in a substantially conventional manner. For example, the user may specifically select which routing elements 14 to couple with the radio transceiver 12 for use as antennas or the user may generally select a desired antenna configuration. Furthermore, the user may utilize a hardware description language (HDL) to implement the desired functionality.

In embodiments where the integrated circuit 10 is a PLD, the integrated circuit 10 may be reprogrammed or reconfigured to form a plurality of antenna configurations, as shown in step 116, and/or to perform a plurality of functions. For example, the specific radio functionality of the integrated circuit 10, including the low-level functionality provided by the radio transceiver 12 and the high-level functionality provided by the circuit elements 16, may be dynamically modified to a desired state. As shown in steps 102, 106, and 108, the specific frequency and protocol utilized by the integrated circuit 10 may also be dynamically modified, such as by reprogramming the integrated circuit 10.

The user may transmit and receive data utilizing the radio transceiver 12 and at least one routing element 14. In preferred embodiments where the integrated circuit 10 is a PLD, the specific radio functionality may be programmed as described above. For example, the integrated circuit 10 may be programmed to transmit or receive information only upon reception of one or more inputs or one or more other conditions. Such functionality may be modified by programming the PLD, as is also described above.

The integrated circuit 10 may transmit data to and receive data from various electronic devices, including other integrated circuits positioned in proximity to the integrated circuit 10, such as other circuits positioned on the same board as the integrated circuit 10, as shown in step 110. The integrated circuit 10 may also transmit data to and receive data from other electronic devices mounted in proximity to the integrated circuit 10, and/or external electronic devices such as a remote computing device, an electronic device, a logic analyzer, a router, a hand-held programmer, and/or any combination thereof, as shown in step 112. Preferably, the integrated circuit 10 is operable to communicate with any device operable to operate on the same frequency as the integrated circuit 10. Additionally, when the integrated circuit 10 is a PLD, the integrated circuit 10 may be reprogrammed, even after initial use and/or initial programming, to transmit data to and receive data from any particular device utilizing any programmed protocol. Furthermore, the integrated circuit 10 may be fully or partially dynamically reconfigured such that its functionality and/or antenna configuration may be modified or otherwise changed on the fly through reprogramming.

As shown in step 114, the ability to wirelessly transmit and receive data 10 provides the integrated circuit 10 with various beneficial functions. For example, the integrated circuit 10 may be mounted in a position which is difficult to physically access and thus use of hand-held programmers or debugging devices may be prohibited. The ability to wirelessly transfer data enables a hand-held programmer or debugging device to wirelessly access the integrated circuit 10 even in situations where the integrated circuit 10 is not physically accessible thereby increasing the operability of the integrated circuit 10.

The integrated circuit 10 may also be configured and programmed by wirelessly communicating with another device. For example, a plurality of devices having a similar configuration to the integrated circuit 10 may be globally configured by a single electronic device. In such a situation, a user could flash a desired configuration across all devices simultaneously without the need to directly access each device.

The integrated circuit 10 may also operate as an identifier device which is operable to provide identification information, such as a serial number, version number of tools used to generate a configuration, and other similar data, to external devices. For example, a user could wirelessly query the integrated circuit 10 using a hand-held device to identify a desired device, such a single integrated circuit positioned in proximity to a plurality of other circuits. Such functionality enables quick and accurate identification of various devices and circuits. Additionally, in embodiments where the integrated circuit 10 is a FPGA, the generally high-level of FPGA functionality provides an advantage over conventional RFID devices that are traditionally limited to simple computations and transmissions.

In some embodiments, such as where UWB frequencies or other high-speed data transfer methods are utilized, the integrated circuit 10 may be configured to transmit real time signal traces to external devices, such as a logic analyzer or a debugger, for wireless debugging. Such wireless debugging enables a particular circuit to be debugged without physically accessing the circuit, thereby overcoming the problems discussed above associated with physically accessing particular circuits.

As shown in step 118 and described in detail above, portions of routing elements 14 and/or the routing matrix 18 may be dynamically programmed to route at least one signal instead of functioning as an antenna. Thus, a first antenna configuration may utilize a portion of the routing matrix 18 as an antenna and a second antenna configuration may utilize the same portion of the routing matrix 18 to route a signal.

Other aspects and embodiments of the present invention will be apparent to those skilled in the art from consideration of the specification and practice of the invention disclosed herein. It is intended that the specification and disclosed embodiments be considered as examples only, with a true scope and spirit of the invention being indicated by the following claims.

What is claimed is:

1. An integrated circuit comprising:

a radio transceiver;

a plurality of circuit elements; and a configurable routing element for routing a signal between at least two of the circuit elements, wherein the routing element is configured to couple with the radio transceiver and to operate as an antenna;

wherein the routing element is configurable via one or more memory elements of the integrated circuit to operate as the antenna;

wherein the plurality of circuit elements, the radio transceiver and the configurable routing element are part of a single integrated circuit;

wherein the routing element carries a radio wave for the radio transceiver in response to the routing element being configured to operate as an antenna; and wherein the at least two circuit elements include programmable logic that implements respective functions according to states of associated respective sets of memory elements of the integrated circuit, and the routing element is configurable to route a logic data signal between the at least two circuit elements when not configured to operate as the antenna.

2. The integrated circuit of claim 1, wherein the integrated circuit is a programmable logic device.

3. The integrated circuit of claim 2, wherein the programmable logic device is a field programmable gate array.

4. The integrated circuit of claim 1, wherein the radio transceiver and the routing element are operable to transmit data to and receive data from another integrated circuit.

5. The integrated circuit of claim 1, wherein the radio transceiver and the routing element are operable to transmit data to and receive data from external electronic devices.

6. The integrated circuit of claim 1, wherein the radio transceiver and the routing element are operable to transmit and receive data utilizing the Bluetooth protocol.

7. The integrated circuit of claim 1, wherein the radio transceiver and the routing element are operable to transmit and receive data utilizing ultra-wideband frequencies.

8. The integrated circuit of claim 7, wherein the radio transceiver and the routing element are operable to transmit and receive data at approximately 10 GHz.

9. The integrated circuit of claim 8, wherein the routing element has a length of approximately 3 cm.

10. The integrated circuit of claim 1, wherein the radio transceiver utilizes application specific modular block architecture.

11. The integrated circuit of claim 10, wherein the circuit elements utilize conventional CMOS.

12. The integrated circuit of claim 1, wherein the routing element is a long-line.

13. The integrated circuit of claim 1, wherein the routing element comprises at least a portion of a routing matrix.

14. An integrated circuit comprising:

a plurality of configurable logic elements;

a plurality of input/output ports configurably coupled to the plurality of configurable logic elements;

a radio transceiver;

a plurality of circuit elements;

wherein one or more of the plurality of circuit elements includes one or more of the plurality of configurable logic elements; and a plurality of configurable routing elements for routing at least one signal between at least two of the circuit elements, wherein at least one of the routing elements is configured to couple with the radio transceiver and to operate as an antenna such that the radio transceiver and at least one routing element are operable to transmit and receive data;

wherein the plurality of configurable logic elements, the radio transceiver and the plurality of configurable routing elements are part of a single integrated circuit;

wherein the at least one routing element carries a radio wave for the radio transceiver in response to the at least one routing element being configured to operate as an antenna; and wherein respective configurable logic elements in the at least two circuit elements implement respective functions according to states of associated respective sets of memory elements of the integrated circuit, and the at least one routing element is configurable to route a logic data signal between the respective configurable logic elements when not configured to operate as the antenna.

15. The integrated circuit of claim 1, further comprising a plurality of configurable routing elements that are configurable via a plurality of memory elements of the integrated circuit to operate in any one of plurality of antenna configurations.

16. The integrated circuit of claim 14, wherein the radio transceiver and at least one routing element are operable to transmit data to and receive data from another integrated circuit.

17. The integrated circuit of claim 14, wherein the radio transceiver and at least one routing element are operable to transmit data to and receive data from external electronic devices.

18. The integrated circuit of claim 14, wherein the radio transceiver and at least one routing element are operable to transmit and receive data utilizing the Bluetooth protocol.

19. The integrated circuit of claim 14, wherein the radio transceiver and at least one routing element are operable to transmit and receive data utilizing ultra-wideband frequencies.

20. The integrated circuit of claim 19, wherein radio transceiver and at least one routing element are operable to transmit and receive data at approximately 10 GHz.

21. The integrated circuit of claim 20, wherein at least one routing element has a length of approximately 3 cm.

22. The integrated circuit of claim 14, wherein the radio transceiver utilizes application specific modular block architecture.

23. The integrated circuit of claim 22, wherein the circuit elements utilize conventional CMOS.

24. The integrated circuit of claim 14, wherein the routing elements comprise at least one vertical long-line and at least one horizontal long-line.

25. The integrated circuit of claim 24, wherein at least one vertical long-line or at least one horizontal long-line is configured to operate as an antenna.

26. The integrated circuit of claim 24, wherein both at least one vertical long-line and at least one horizontal long-line are configured to simultaneously operate as antennas.

27. The integrated circuit of claim 26, wherein at least one vertical long-line and at least one horizontal long-line are coupled with the radio transceiver to simultaneously transmit and receive data.

28. The integrated circuit of claim 26, wherein the integrated circuit includes a first radio transceiver and a second radio transceiver such that at least one vertical long-line is coupled with the first radio transceiver and at least one horizontal long-line is coupled with the second radio transceiver.

29. The integrated circuit of claim 27, wherein at least one vertical long-line and at least one horizontal long-line both simultaneously transmit polarized radio waves.

30. The integrated circuit of claim 14, wherein the routing elements comprise a programmable routing matrix.

31. The integrated circuit of claim 30, wherein the routing matrix is programmable to form an antenna configuration from at least one routing element.

32. The integrated circuit of claim 31, wherein the antenna configuration is selected from the group consisting of a horizontal line configuration, a dipole configuration, a yagi-type configuration, a horizontal line array configuration, a loop configuration, and any combination thereof.

33. The integrated circuit of claim 14, wherein the antenna functionality is operable to be dynamically modified.

34. An integrated circuit comprising:

a plurality of configurable logic elements;

a plurality of input/output ports configurably coupled to the plurality of configurable logic elements;

a radio transceiver;

a plurality of circuit elements;

a plurality of routing elements;

wherein one or more of the plurality of circuit elements includes one or more of the plurality of configurable logic elements; and a programmable routing matrix for routing at least one signal between at least two of the circuit elements, the routing matrix being programmed to couple with the radio transceiver, wherein the routing matrix is formed from at least a portion of the routing elements and is programmed to form an antenna configuration from at least one of the routing elements such that the radio transceiver and the antenna configuration are operable to transmit and receive data;

wherein the plurality of configurable logic elements, the radio transceiver and the programmable routing matrix are part of a single integrated circuit;

wherein the at least one routing element carries a radio wave for the radio transceiver in response to the at least one routing element being programmed to form an antenna; and wherein respective configurable logic elements in the at least two circuit elements implement respective functions according to states of associated respective sets of memory elements of the integrated circuit, and the at least one routing element is configurable to route a logic data signal between the respective configurable logic elements when not configured to operate as the antenna.

35. The integrated circuit of claim 34, wherein the radio transceiver and the antenna configuration are operable to transmit data to and receive data from another integrated circuit.

36. The integrated circuit of claim 34, wherein the radio transceiver and the antenna configuration are operable to transmit data to and receive data from external electronic devices.

37. The integrated circuit of claim 34, wherein the radio transceiver and the antenna configuration are operable to transmit and receive data utilizing the Bluetooth protocol.

38. The integrated circuit of claim 34, wherein the radio transceiver and the antenna configuration operable to transmit and receive data utilizing ultra-wideband frequencies.

39. The integrated circuit of claim 38, wherein radio transceiver and the antenna configuration are operable to transmit and receive data at approximately 10 GHz.

40. The integrated circuit of claim 39, wherein at least a portion of the antenna configuration has a length of approximately 3 cm.

41. The integrated circuit of claim 34, wherein the radio transceiver utilizes application specific modular block architecture.

42. The integrated circuit of claim 41, wherein the circuit elements utilize conventional CMOS.

43. The integrated circuit of claim 34, wherein the radio transceiver is operable to perform low-level radio functionality and the circuit elements are operable to perform high-level radio functionality.

44. The integrated circuit of claim 34, wherein the antenna configuration is selected from the group consisting of a horizontal line configuration, a dipole configuration, a yagi-type configuration, a horizontal line array configuration, a loop configuration, and any combination thereof.

45. The integrated circuit of claim 34, wherein the antenna configuration is operable to be dynamically modified.

46. The integrated circuit of claim 34, wherein the routing matrix includes at least one horizontal long-line and at least one vertical long-line.

47. The integrated circuit of claim 46, wherein the antenna configuration is formed of at least one horizontal long-line and at least one vertical long-line such that at least one horizontal long-line and at least one vertical long-line are operable to simultaneously transmit and receive data.

48. The integrated circuit of claim 47, wherein at least one vertical long-line and at least one horizontal long-line both simultaneously transmit polarized radio waves.

49. The integrated circuit of claim 34, wherein the radio transceiver is configurable to transmit at a desired frequency.

50. The integrated circuit of claim 14, wherein the integrated circuit is a programmable logic device.

51. The integrated circuit of claim 34, wherein the integrated circuit is a programmable logic device.

* * * * *

UNITED STATES PATENT AND TRADEMARK OFFICE

CERTIFICATE OF CORRECTION

PATENT NO. : 7,627,291 B1
APPLICATION NO. : 11/040133
DATED : December 1, 2009
INVENTOR(S) : James-Roxby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Second Day of November, 2010

David J. Kappos

David J. Kappos
*Director of the United States Patent and Trademark Office*